(12) United States Patent
Huber et al.

(10) Patent No.: US 7,481,049 B2
(45) Date of Patent: Jan. 27, 2009

(54) DEVICE FOR THE DOSING OF A REDUCING AGENT

(75) Inventors: Sven Huber, Ainring (DE); Hanspeter Mayer, Piesting (AT); Gerhard Mueller, Freilassing (DE); Michael Offenhuber, Adnet (AT); Alexander Moell, Tuttlingen (DE); Helmut Moell, legal representative, Tuttlingen (DE); Brigitte Moell, legal representative, Tuttlingen (DE)

(73) Assignee: Robert Bosch GmbH, Stuttgart (DE)

( * ) Notice: Subject to any disclaimer, the term of this patent is extended or adjusted under 35 U.S.C. 154(b) by 644 days.

(21) Appl. No.: 10/130,697

(22) PCT Filed: Sep. 24, 2001
(Under 37 CFR 1.47)

(86) PCT No.: PCT/DE01/03663

§ 371 (c)(1),
(2), (4) Date: Aug. 18, 2004

(87) PCT Pub. No.: WO02/25075

PCT Pub. Date: Mar. 28, 2002

(65) Prior Publication Data

US 2005/0069468 A1    Mar. 31, 2005

(30) Foreign Application Priority Data

Sep. 22, 2000    (DE) ............................... 100 47 531

(51) Int. Cl.
*F01N 7/00* (2006.01)
(52) U.S. Cl. .............................. 60/324; 60/286; 60/295; 60/303; 239/128; 239/130
(58) Field of Classification Search .................. 60/286, 60/295, 301, 303, 307, 324; 239/128, 129, 239/130, 131, 407, 408, 585.1
See application file for complete search history.

(56) References Cited

U.S. PATENT DOCUMENTS

| | | | |
|---|---|---|---|
| 5,605,042 A | * | 2/1997 | Stutzenberger .............. 60/286 |
| 5,943,858 A | | 8/1999 | Hofmann et al. |
| 5,976,475 A | | 11/1999 | Peter-Hoblyn et al. |

(Continued)

FOREIGN PATENT DOCUMENTS

DE    197 43 302 A1    2/1999

(Continued)

*Primary Examiner*—Tu M Nguyen
(74) *Attorney, Agent, or Firm*—Ronald E. Greigg

(57) ABSTRACT

An apparatus for metering a urea or a urea-water solution for delivery to a catalytic converter assembly for removing nitrogen oxides from the exhaust gases of a Diesel engine, includes a housing block supporting function components communicating via a line, formed by recesses in the housing block, for transporting the reducing agent, and the walls of the line are formed by the housing block. This apparatus assures a simple line layout for reducing agent with a minimum number of sealing points that is accordingly appropriate for large-scale mass production.

21 Claims, 4 Drawing Sheets

U.S. PATENT DOCUMENTS

| | | |
|---|---|---|
| 6,063,350 A | 5/2000 | Tarabulski et al. |
| 6,192,677 B1 * | 2/2001 | Tost .............................. 60/286 |
| 6,519,935 B2 * | 2/2003 | Weigl ........................... 60/286 |
| 6,526,746 B1 * | 3/2003 | Wu ............................... 60/286 |
| 6,539,708 B1 * | 4/2003 | Hofmann et al. ............... 60/286 |
| 6,814,303 B2 * | 11/2004 | Edgar et al. .................. 239/128 |
| 2003/0033799 A1 * | 2/2003 | Scheying ..................... 60/286 |
| 2006/0101810 A1 * | 5/2006 | Angelo et al. ................. 60/286 |

FOREIGN PATENT DOCUMENTS

| | | |
|---|---|---|
| DE | DE 199 46 900 A1 | 12/2000 |
| WO | WO 96/36797 A1 | 11/1996 |
| WO | WO 99/58230 A1 | 11/1999 |

* cited by examiner

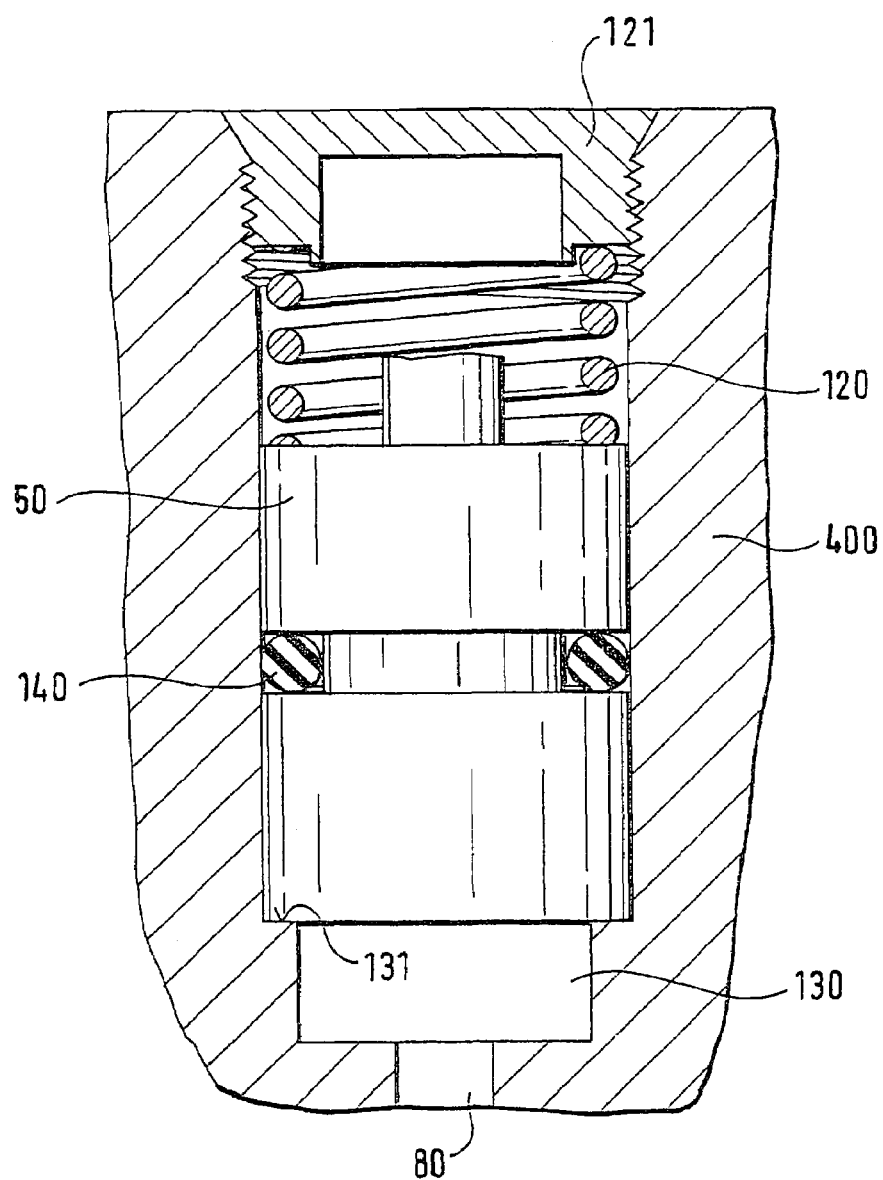

DEVICE FOR THE DOSING OF A REDUCING AGENT

CROSS-REFERENCE TO RELATED APPLICATIONS

This application is a 35 USC 371 application of PCT/DE 01/03663 filed on Sep. 24, 2001.

BACKGROUND OF THE INVENTION

1. Field of the Invention

The invention is based on an apparatus for metering a reducing agent, in particular a urea or a urea-water solution, in the context of catalytic posttreatment of exhaust gases.

2. Description of the Prior Art

To achieve a reduction in $NO_x$ components in exhaust gases, reduction catalytic converters have been developed, especially for Diesel engines, and are typically classified as either so-called SCR catalytic converters (for Selective Catalytic Reduction) or reservoir-type catalytic converters. The so-called SCR catalytic converters are regenerated by delivering a reducing agent comprising urea and/or ammonia, while the so-called reservoir-type catalytic converters are regenerated in so-called rich exhaust gas phases with hydrocarbons from the entrained internal combustion engine fuel.

It is known for the various components of a metering system to be made to communicate via hoses. From German Patent Application 199 46 900.8, an apparatus is known which for removing nitrogen oxides from exhaust gases, for instance from a Diesel engine, meters in urea as a reducing agent. Means intended for this purpose are sometimes secured to a plastic or metal block or integrated with such a block. The metering system described is relatively large and complicated to produce, since it comprises a plurality of components located in line with one another.

SUMMARY OF THE INVENTION

The metering apparatus of the invention has the advantage over the prior art of a simple, sturdy line layout with a minimum number of sealing points, which can be produced economically and in large-scale mass production. Since there are only a few sealing points, there is less risk of leaks and therefore less risk of failure. Hoses and separate screw fastenings for lines can be omitted. Because of the smaller number of required components and the smaller structural size, the effort and expense of assembly is less, the overall structural volume is decreased, and the production and system costs are thus lowered. The structural unit can be checked for tightness, for instance, after preassembly, which means reduced rejection costs compared to finding defects upon final system checking. The recesses can be disposed in various ways, for instance in the form of bores; additional bores make it possible to expand the basic functions of the metering apparatus by mounting additional components. The provision of recesses in a housing block makes it possible to attach the metering means and other function components to the housing block; the length of the line filled with reducing agent is kept short as a result, so that the liquid can be rapidly thawed again after ice forms. Short line layouts are also fast to fill, and the requisite pressure for operation can be built up quickly.

It is especially advantageous for all the means to be connected to one another via at least one rectilinear supply line that traverses the entire housing block. This line layout is simple to produce and makes possible an adroit arrangement of components that have to be connected to one another. Moreover, it can be embodied in a simple way as an injection-molded bore, for instance in a plastic block that receives the various system components.

The open ends of the line can advantageously be closed by function components, so that separate closure elements such as closure screws are unnecessary.

A heating element, introduced in particular axially parallel to the recess, such as an electric heating rod embodied as an electrical resistor, can advantageously heat a central line quickly in order to thaw a frozen fluid or to protect the apparatus from freezing. Alternatively, or in combination with the electric heating rod, the housing block can also comprise an electrically conductive material, in particular an electrically conductive plastic, which as described in German Patent Application 199 46 900.8, is provided with electrodes that can be subjected to an electrical voltage, in order to achieve an electric current for heating the entire assembly by way of the housing block.

The material comprising the housing block is advantageously selected such that because of a low modulus of elasticity of the material, this material can contribute to volumetric compensation if ice forms in the line.

It is also advantageous to integrate compensatory or resilient elements in the assembly, so that a freeze-resistant metering system can be furnished that remains intact after freezing and thawing cycles and that protects integrated components against destruction from ice formation. The individual components themselves need not be embodied as completely freeze-resistant. Moreover, materials that are not resistant to high pressure can also be used, in particular for the housing block, since the buildup of excessive pressure forces in such extreme situations as freezing is averted.

BRIEF DESCRIPTION OF THE DRAWINGS

Exemplary embodiments of the invention are described more fully herein below, in conjunction with the drawings, in which:

FIG. 4 is a further detail view.

DESCRIPTION OF THE PREFERRED EMBODIMENTS

Figure 1:
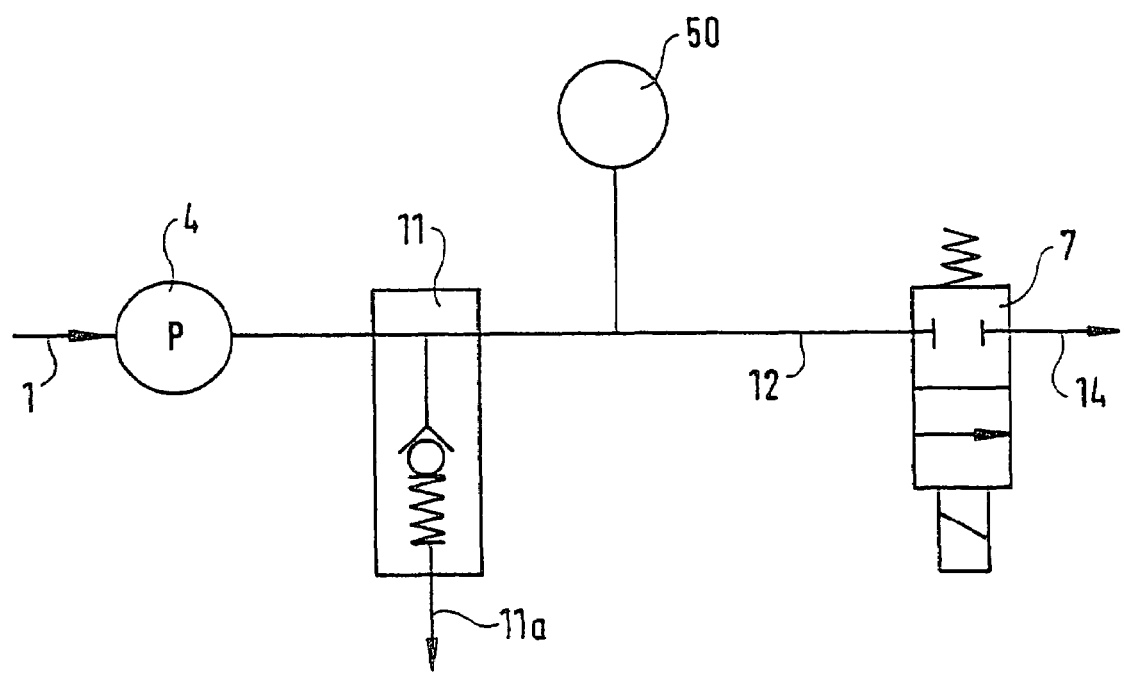
FIG. 1 shows the functional layout of a metering apparatus.

In FIG. 1, reference numeral 1 indicates the inlet to the metering apparatus, by way of which a urea-water solution is supplied to the apparatus. A metering pump 4 aspirates the fluid. The pump 4 is rpm-controlled via a stepping motor, not shown. A pressure regulator 11 carries any excess pumped quantity of fluid via the outlet 11a of the pressure regulator either back to the inlet of the metering apparatus or to the metering pump or to a urea tank, not shown in detail, from which the metering pump 4 is supplied via the inlet 1. The line 12 connecting the inlet 1, pump 4 and pressure regulator 11 carries the pumped fluid onward to a metering valve 7. A pressure sensor 50 for measuring the pressure in the line 12 is mounted upstream of the metering valve. The metering valve is electrically triggerable and dispenses the fluid in accordance with the electrical triggering to components connected to the outlet 14. This is for example a mixing chamber, not shown in detail but already described in the aforementioned German application 199 46 900.8, to which compressed air from a compressed air container can be delivered in order to form an aerosol from the urea-water solution, which can then be injected into the inlet region, in particular of a motor vehicle exhaust gas catalytic converter.

The metering pump 4 meters the requisite quantity of urea-water solution in accordance with the reducing method employed. A secondary control unit, not shown in detail, acquires data for this purpose pertaining to the engine operating state, which are received from a higher-ranking engine control unit via a CAN data line, along with the signals of various pressure, temperature and fill level sensors, not described in detail here.

From the sensor information and the information from the engine control unit, the secondary control unit calculates a urea metering quantity and triggers the metering valve accordingly.

In an alternative embodiment, the reducing agent can also be injected by the injection valve 7 directly into the inlet region of the catalytic converter, in other words without reinforcement with compressed air or without having to provide a mixing chamber.

Figure 2:
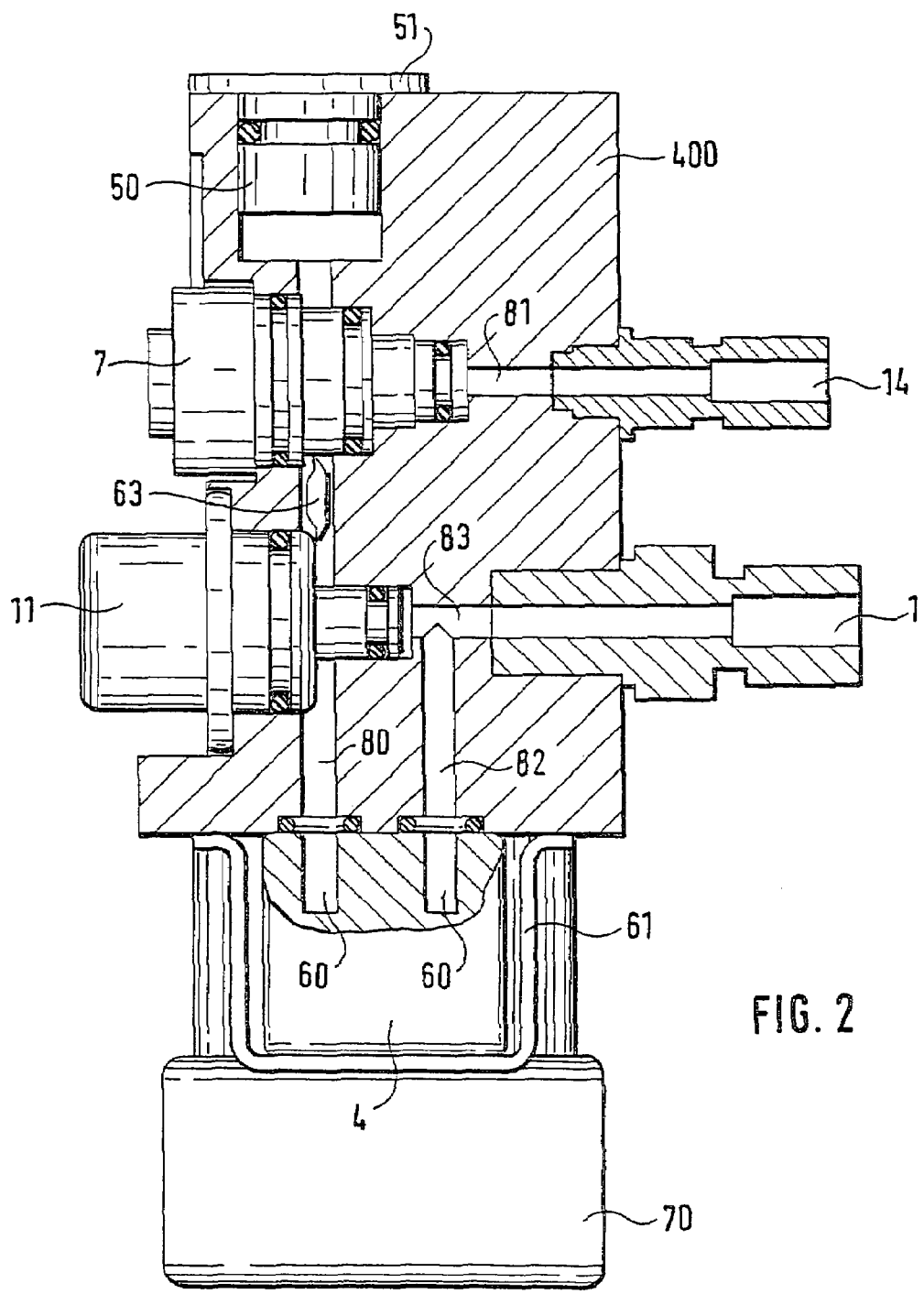
FIG. 2 is a fragmentary sectional view showing components of a metering apparatus that are integrated into a housing block provided with recesses.

FIG. 2 is a cross-sectional view through a metering apparatus of the invention, which has a housing block 400, in particular of electrically conductive plastic, with a modulus of elasticity between approximately 1000 N/mm$^2$ and approximately 7000 N/mm$^2$. The housing block has recesses in the form of bores 80, 81, 82 and 83, which form the reducing agent line 12 shown in FIG. 1. The bore 80 traverses the entire block. The pump lines 60 of the metering pump 40 are connected via O-rings to the ends of the bores 80 and 82, and the pump is secured to the surface of the housing block via an elastic sheet-metal angle piece 61. A pressure regulator 11, acting to compensate for pressure if ice forms and having a diaphragm not shown in detail, is flanged to the surface of the housing block, and two O-rings seal off the head of the pressure regulator that protrudes into the housing block. Analogously, a metering valve 7 is secured to the housing block. On the end of the housing block opposite the metering pump 4, the bore 80 merges with a region of larger cross section, where a pressure sensor 50 is accommodated. The pressure sensor is secured to the surface of the housing block via a flexible, elastic flange 51. Once again, O-rings assure sealing of the bore that can be filled with a fluid.

Via the bore 81, the metering valve 7 communicates with the flanged-on outlet 14 of the metering apparatus. The inlet 1 flanged on next to it communicates with the bores 83 and 82 and serves to supply the reducing agent from a reservoir to the metering pump 4. In the bore 80, between the pressure regulator 11 and the metering valve 7, there is an air-filled elastic hose 63, which is secured to the bore wall, for instance by means of an adhesive. The electric pump motor, which is also secured to the housing block 400, is disposed above the metering pump. A control unit, not shown in detail, is connected electrically, in a manner not shown in detail, to both the metering valve and the pressure sensor and also to other sensors, not shown in detail, such as a fill level sensor for the urea tank, and from the engine control unit this control unit receives data on the operating state of the engine whose exhaust gases are to be chemically reduced with the aid of the metering apparatus in the exhaust system.

The housing block 400 serves to receive and secure various means for supply reducing agent and further function components, such as the pressure sensor 50, metering valve 7, pressure regulator 11 and metering pump 4. The rectilinear bore 80 traverses the housing block from one end to the other and can be designed in a way appropriate for manufacture, for instance conically or stepped in the case of a plastic block, or cylindrically for the sake of metal-cutting machining in the case of a metal housing block. In addition, further bores 81 through 83 are provided, some of which extend parallel and others perpendicular to the through bore 80 and assure the attachment of the assembly to a reducing agent reservoir and to the catalytic converter as well as assuring pressure compensation via the pressure regulator 11. The pressure regulator 11 and the metering valve 7 protrude with their line connections, not shown in the drawings, into the bore 80, so that they each communicate with the bore; simultaneously, they close off the bore from the outside. The assembly has a plurality of structural characteristics for compensating for volumetric fluctuations resulting from freezing or melting of the reducing agent during cold weather. Because the metering pump 4 is secured to the housing block 400 by means of the elastic sheet-metal angle piece 61, a compensation capability in the event of severe pressure fluctuations caused by a phase transition is assured because the pump lines 60 together with the metering pump 4 all move relative to the bores 80 and 82, and thus the volume in the line system that carries the reducing agent can adapt automatically when otherwise the housing block could burst, or such components as the metering valve or pressure sensor could become damaged. O-ring seals continue to keep the line tightly closed. The pressure sensor 50, secured axially resiliently to the housing block via the flexible elastic flange 51, is likewise pressed outward by a volumetric expansion in the event of ice formation. If the ice melts again, the pressure sensor and the metering pump move reversibly back to their outset position. The pressure regulator 11, which is known per se and is commercially available, has a built-in elastic diaphragm, which is relieved to the ambient air. This diaphragm can yield elastically if ice forms and can thus also help to compensate for the increase in volume if ice forms. Moreover, because of its low modulus of elasticity, the housing block can to a certain extent absorb the ice pressure by expanding. In addition, the air-filled elastic hose 63 serves to reduce the circumferential tension in the bore wall, because upon freezing of a urea-water solution, for instance, it is compressed and thus can absorb some of the line pressure building up at the time.

In an alternative embodiment, still other bores may be provided, which connect the components for feeding and metering compressed air to one another, so that if a compressed air-supported development of an aerosol is intended for injection into a catalytic converter assembly, once again a compact, integrated assembly can be furnished. In that case, instead of the metering valve 7, a metering valve together with a mixing chamber is secured to the housing block, into which chamber the reducing agent can be metered and which chamber can be subjected to compressed air. In this case, the outlet 140 forms the outlet of the mixing chamber. The bores both for the reducing agent lines and for the supply of compressed air can also be made by injection molding, especially when plastic is used.

Instead of an air-filled elastic hose 63, other volumetrically elastic elements can be used, such as gas-filled plastic microballoons; hollow, gas-filled fibers closed on the ends; or gas-filled hoses, wound spirally in a manner similar to a compression spring.

Figure 3:
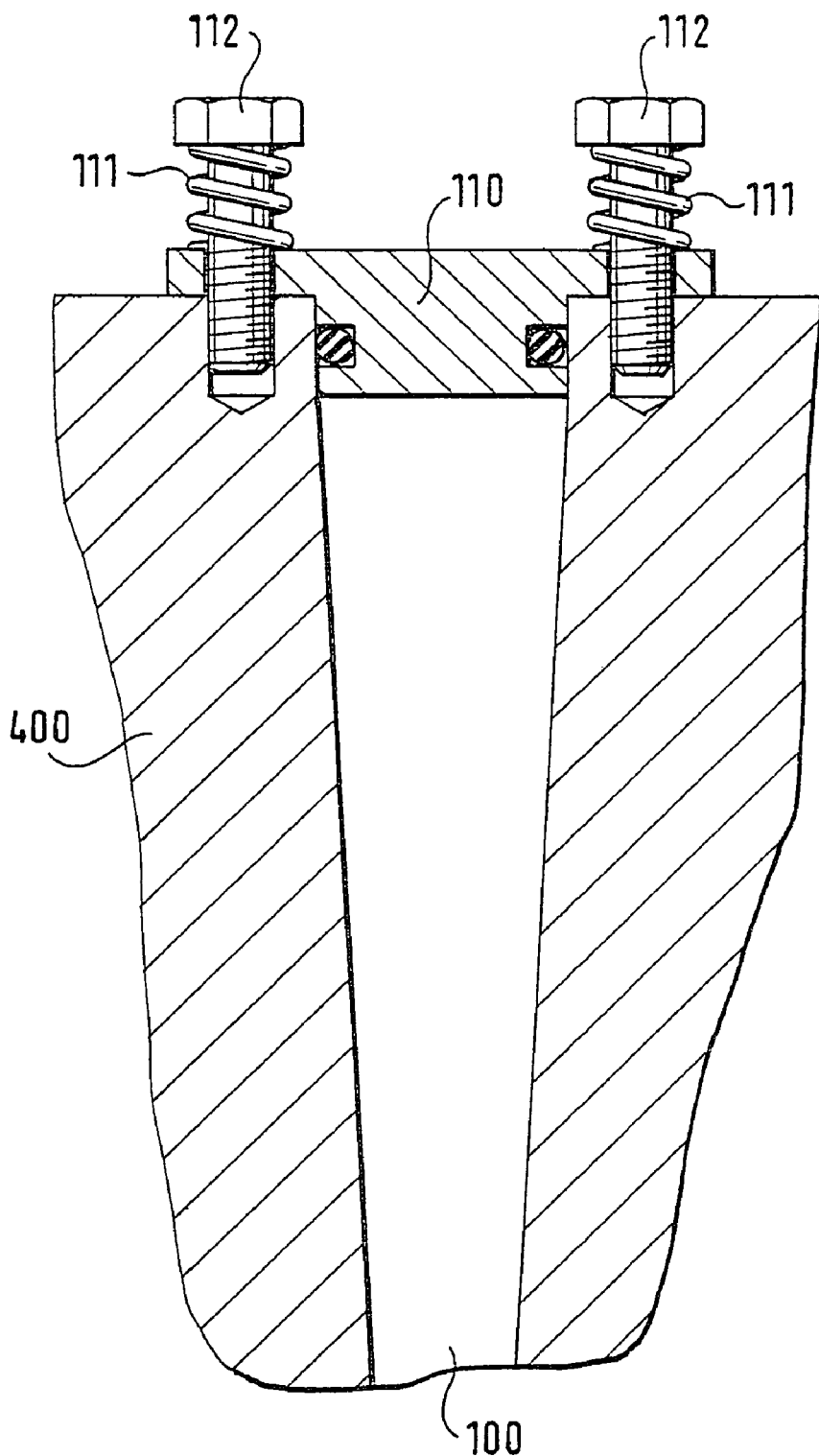
FIG. 3 is a detail view of a further embodiment of the invention.

FIG. 3, in cross section, shows a detail of an alternative metering apparatus, in which a bore discharging into a cavern 100 is provided. This bore is for instance a bore that is in communication with the bore 80. The cavern is embodied as a bore that is conical toward the outside and is closed with a flange 110; O-ring seals assure sealing even if the position of the flange changes. The flange is in fact supported axially movably via compression springs 111 and screws 112.

In the event of freezing, the fluid in the line, that is, in the bores and thus also in the bore discharging into the cavern 100, expands and presses against the housing block. To a limited extent, the bore walls yield, as already noted above. Any further increase in the pressure could cause the housing to burst. The support of the flange 110 embodied as a resilient element is now dimensioned such that in good time before any risk of bursting, it yields to the ice pressure by moving axially and thus limits the pressure in the bore in the event of ice formation. The conical embodiment of the bore here results in an amplified axial direction of action of the ice pressure and carries this pressure to the resilient flange. Given suitable dimensioning of the components, this process can be repeated cyclically as often as desired.

The cavern 100 can also be embodied as a cylinder, or as a cylinder with a multiply graduated inside diameter, or in other words can be formed by the peripheral region of the bore itself or by a cylindrical hollow chamber with a different diameter, in particular a larger diameter, than the bore. The cavern can also have any feasible geometry.

FIG. 4 illustrates an alternative, axially movable securing of the pressure sensor 50. A compression spring 120 presses it against a bore step 131 of the sensor bore 130. The compression spring 120 is braced here on a threaded ring 121 that is secured to the housing block 400. An O-ring seal 140 in a radial indentation in the pressure sensor assures sealing off of the fluid volume formed by the bore 80 and the sensor bore 130.

If the urea-water solution freezes, then as a consequence of a volumetric expansion the pressure in the bore 80 and in the widened-diameter sensor bore 130 increases, until the spring force of the compression spring 120 is reached. Then the pressure sensor 50 is displaced counter to the spring force and increases the volume in the sensor bore 130. By this variant installation, both the pressure sensor 50 and the block 400 are protected against excessively high ice pressure loads.

The foregoing relates to preferred exemplary embodiments in the invention, it being understood that other variants and embodiments thereof are possible, within the spirit and scope of the invention, the latter being defined by the appended claims.

We claim:

1. An apparatus for metering a reducing agent, in particular urea or a urea-water solution, comprising a housing block, means (4, 7, 11) secured to the housing block for delivering the reducing agent to a catalytic converter assembly for removing nitrogen oxides from the exhaust gases of a Diesel engine,
said means communicating via a line (12; 80, 81, 82, 83), formed by recesses in the housing block (400), for transporting the reducing agent, and
the walls of the line being formed by the housing block, and wherein the means, at least in part, is secured to the housing block and connected to the line with the aid of elastic elements (61, 51) in such a way that the applicable means can execute a compensatory motion if ice forms in the line to increase the volume inside the line to prevent destructive forces on at least one of the housing block and the means.

2. The apparatus of claim 1, wherein said means includes a pump (4), and wherein the elastic clement that secures the pump is embodied as an elastic sheet-metal angle piece (61) secured to the housing block.

3. The apparatus of claim 1, wherein the means includes a pressure regulator (11) that has a diaphragm acting to compensate for pressure in the event of ice formation.

4. The apparatus of claim 1, wherein at least one recess (80) rectilinearly traverses the entire housing block (400).

5. The apparatus of claim 4, further comprising a heating element extending generally parallel to at least one recess, said heating element being secured to the housing block or embedded in the housing block.

6. The apparatus of claim 1, further comprising a heating element extending generally parallel to at least one recess, said heating element being secured to the housing block or embedded in the housing block.

7. The apparatus of claim 6, wherein the recesses are embodied as bores.

8. The apparatus of claim 1, wherein the housing block is of plastic.

9. The apparatus of claim 8, wherein the plastic has a low modulus of elasticity in the range from approximately 1000 $N/mm^2$ to approximately 7000 $N/mm^2$.

10. The apparatus of claim 1, wherein at least one volumetrically elastic component is disposed in the line.

11. The apparatus of claim 10, wherein the at least one volumetrically elastic component is an air-filled element (63).

12. The apparatus of claim 1, wherein the recesses are embodied as bores.

13. The apparatus of claim 12, wherein the housing block is injection-molded.

14. The apparatus of claim 13, wherein all the ends of the line communicate with the means (4, 7, 11) and further function components (1, 14, 50, 110), so that no separate closure elements are required.

15. The apparatus of claim 1, wherein all the ends of the line communicate with the means (4, 7, 11) and further function components (1, 14, 50, 110), so that no separate closure elements are required.

16. The apparatus of claim 15, wherein one end of the line is closed by a compensation element embodied as a spring-loaded flange (110).

17. The apparatus of claim 1, wherein the function components include a pressure sensor (50), which is secured resiliently to the housing block and closes the line in a tightly displaceable manner.

18. The apparatus of claim 1, wherein one end of the line is closed by a compensation element embodied as a spring-loaded flange (110).

19. The apparatus of claim 15, wherein the further function components are, at least in part, secured to the housing block and connected to the line with the aid of elastic elements (61, 51) in such a way that the function components can execute a compensatory motion if ice forms in the line to increase the volume inside the line to prevent destructive forces on at least one of the housing block and the further function components.

20. The apparatus of claim 19, wherein at least one volumetrically elastic component is disposed in the line.

21. The apparatus of claim 20, wherein the at least one volumetrically elastic component is an air-filled element (63).

* * * * *